United States Patent Office 3,830,868
Patented Aug. 20, 1974

3,830,868
PROCESSES FOR THE OXIDATIVE DEHYDRO-
GENATION OF HYDROCARBONS
Darrell W. Walker, Bartlesville, Okla., assignor to
Phillips Petroleum Company
No Drawing. Original application May 6, 1971, Ser. No.
140,964, now abandoned. Divided and this application
Apr. 19, 1973, Ser. No. 352,742
Int. Cl. C07c 5/18
U.S. Cl. 260—680 E
6 Claims

ABSTRACT OF THE DISCLOSURE

Organic compounds are dehydrogenated to compounds having a higher degree of unsaturation by contacting the feedstock at elevated temperatures in the vapor phase in the presence of an oxygen-containing gas with a catalyst comprising iridium and arsenic in combination with a zinc aluminate catalytic carrier. Representative of such conversions is the oxidative dehydrogenation of butane to butenes and butadiene. The conversion products are valuable compounds particularly useful as intermediates for the preparation of polymeric materials such as synthetic rubbers and the like.

---

This is a division of application Ser. No. 140,964, filed May 6, 1971, now abandoned.

The present invention relates to chemical compositions and chemical processes. More particularly, the invention relates to catalyst compositions, their preparation, and the catalytic processes employing such compositions, e.g., processes for effecting the dehydrogenation of hydrocarbons.

Dehydrogenation processes for the conversion of organic compounds to compounds having a high degree of unsaturation include both thermal noncatalytic processes and catalytic processes. The former are characterized by undesirable side reactions, low order of conversion and yields and poor product selectivity. The catalytic processes are generally characterized by the particular catalytic material employed and the conditions under which the processes are operated, e.g., in the absence or presence of oxygen. Generally, such processes can be considered equilibrium limited, i.e., the conversion of the starting material to product is accompanied by an evolution of hydrogen. As the conversion increases, so does the production of hydrogen until an equilibrium state is reached. Continued evolution of hydrogen tends to drive the reaction back. Thus, it would seem that oxidative dehydrogenation processes, which result in a continued consumption of the produced hydrogen, would result in more efficient conversion processes. However, on the other hand, oxidative dehydrogenation processes generally do not attain the high conversion rates which are characteristic of the nonoxidative processes and, as a consequence, require recovery or recycle or dumping of unconverted feedstock. The search continues for dehydrogenation processes, both oxidative and nonoxidative, which function at or near equilibrium with a minimum of undesirable side reactions.

A number of catalysts and catalyst systems which include halogens or halogen-releasing compounds have been disclosed. These, however, exhibit many disadvantages in regard to equipment corrosion and additional expense of continuously feeding, recovering and recycling the relatively expensive halogen materials. Halogen-free catalysts continue to be the most desirable for use in dehydrogenation processes.

The present invention provides a novel catalyst and a novel process for the conversion of hydrocarbon feedstocks to hydrocarbons having a greater degree of unsaturation and which have the same or lower number of carbon atoms as in the hydrocarbon feed. According to this invention, hydrocarbon feedstock can be converted directly to hydrocarbons having a greater degree of unsaturation by contacting said feedstock under dehydrogenation conditions in the vapor phase in the presence of molecular oxygen with a catalytic material comprising iridium and arsenic in combination with a Group II aluminate spinel carrier material. Thus, paraffinic hydrocarbons can be converted in good yields to diolefins and/or monoolefins and monoolefins can be converted to diolefins. The invention is particularly suitable for the production of diolefins from paraffins and particularly useful results are obtained by the dehydrogenation of butane to 1,3-butadiene.

The hydrocarbon feedstocks which are applicable for the oxidative dehydrogenation processes of the present invention comprise dehydrogenatable aliphatic hydrocarbons having from about 2 to about 12 carbon atoms per molecule and at least one

grouping. These can be branched or unbranched and include paraffins as well as monoolefins, but paraffins are presently preferred. The conversion of butane to 1,3-butadiene and butenes has been found particularly advantageous by the processes of the invention. Some specific examples of other feeds include propane, isobutane, pentane, hexane, 2-methylhexane, octane, 2,4-dimethyloctane, butene-2, 2-methylbutene-1, hexene-2, octene-1, 3-methylnonene-4, dodecene-1, and the like, including mixtures thereof.

The novel catalysts of the present invention comprise iridium in association with arsenic in combination with a carrier material selected from the class consisting of a Group II aluminate spinel. The exact form of the iridium and arsenic in the catalytic compositions of this invention is not known. Thus, the iridium and arsenic may be in the elemental state but are most probably combined with sufficient oxygen to form one or more neutral compounds such as iridium oxide, arsenic oxide, etc., depending upon the proportions of each element present. In general, the iridium content, calculated as free metal, of the catalyst will be in the range of 0.01 to 10 weight percent, with a preferred amount of iridium being in the range of 0.25 to 2.5 weight percent. The arsenic, calculated as free metal, is generally employed in the range of 0.01 to 5 weight percent, and preferentially in the range of 0.25 to 1.0 weight percent. Throughout this application, the term weight percent means parts by weight of iridium and/or arsenic per 100 parts by weight of carrier material. Sufficient alkali or alkaline earth metal compounds are used to neutralize the acid sites of the catalyst composite including the metal and support, to leave the composite alkaline, and to activate the catalyst for the dehydrogenation of steam-diluted hydrocarbon feedstock. The optimum amount of each alkali or alkaline earth metal compound or combination of compounds for each supported metal catalyst must be determined experimentally, but usually an amount in the range of 0.5 to 10 weight percent of the total catalyst is effective. However, sufficient alkaline material must be employed to impart an alkaline pH of at least 8 to the catalyst.

Any iridium-containing metal compound which itself contains no nonvolatile acidic residues after volatilization can be used. It has been found that such compounds, i.e., compounds having no nonvolatile acidic residues, increase the on-stream life of the catalyst. Suitable iridium-containing compounds include both the simple or noncoordination compounds as well as the complex or coordination compounds, particularly the tri- and tetravalent forms of iridium. The complex or coordination compounds of iridium are preferred materials for preparing the catalysts of the present invention with such compounds having coordination numbers of 4 or 6, preferably 6, being preferred. Exemplary of suitable iridium compounds are iridium cyano compounds such as potassium hexacyanoiridate (III), ammonium hexachloroiridate (III), hexacyanoiridic (III) acid, iridium halides such as the monochloride, trichloride, tetrafluoride, hexafluoride, the hexachlorodate (III), the hexachlorodate (IV), tribromide and triiodide; hexachloroiridic (IV) acid; iridium nitro compounds such as sodium hexanitroiridate (III); iridium oxides and hydroxides such as iridium trihydroxide, iridium tetrahydroxide, and iridium dioxide, and including the oxide obtained by heating finely dispersed iridium and sodium peroxide; iridium sesquisulfate; iridium sulfite; iridium sulfides such as iridium monosulfide, iridium sesquisulfide, and iridium disulfide; and iridicium salts which contain the ion $[(C_5H_5)_2Ir]^+$ bis-(cyclopentadienyl) iridium (III) cation, including the mineral acid salts, the tribromide and polyiodides. Of the iridium (III) and iridium (IV) complexes, the anionic forms are particularly preferred including the hydride complexes $[IrHCl_2(R_3P)_3]$, $[IrH_2Cl(R_3P)_3]$ and $[IrH_3(R_3P)_3]$ and the hexahaloiridium (IV) complexes in which the halide may be fluoride, chloride or bromide. Mixtures of the iridium compounds can be used.

Substantially any arsenic compound can be employed in the preparation of the catalysts of this invention so long as such compounds are not detrimental to the final oxidative dehydrogenation catalysts and essentially any of the elements which may be combined with such arsenic are removed from the final catalyst by prior washing or by volatilization. Illustrative of such arsenic compounds are sodium arsenate, arsenic acid, triphenylarsine, and the like. Mixtures of arsenic compounds can be used.

The Group II aluminate spinels which are employed in the practice of this invention are compounds of the formula $M(AlO_2)_2$ or $MO \cdot Al_2O_3$ wherein M is a Group IIa or Group IIb metal with a valence of 2, such as zinc, magnesium, beryllium, calcium and the like, including mixtures thereof. Of these, the zinc aluminate spinel is preferred. Such spinels can be prepared by any conventional method. A convenient method is by coprecipitation wherein appropriate amounts of suitable Group II metal compounds are combined under spinel-forming conditions. It is preferred that the proportions of these ingredients be approximately stoichiometric or, alternatively, that the Group II compound, such as a zinc compound, be up to 10 percent or more in excess of stoichiometric. Certain zinc aluminate spinels are obtained by calcining a mixture of finely divided zinc oxide and a very finely divided alumina, such as the product obtained by the flame hydrolysis of aluminum chloride, and such spinels are presently preferred as carriers in accordance with the invention.

The catalytically effective amounts of iridium and arsenic can be combined with the Group II aluminate spinel carrier materials in any conventional manner. A convenient method of preparation is to coprecipitate suitable iridium and arsenic compounds from aqueous solution followed by conventional aging, washing, drying, etc. The Group II aluminate spinel carrier material can be introduced conveniently during this coprecipitation stage of catalyst preparation. Alternatively, a solid Group II aluminate spinel carrier material, generally in the finished form of a pellet, sphere, or particle, is impregnated with solutions of iridium and arsenic compounds. The impregnated catalytic material can then be dried and calcined. A number of the iridium compounds are relatively insoluble in water, and such compounds can be combined with the other materials in forming the catalyst of this invention by forming a slurry of the nonsoluble iridium compound, the arsenic solution and the solid Group II aluminate spinel carrier material followed by drying and calcination. When other catalyst-modifying agents are used, they can be introduced into the catalyst either before, during or after the iridium and arsenic compounds have been associated with the support. Some amounts of solid elements involved in the preparation of the catalyst can be tolerated in the final catalytic composition. For example, if a sulfate such as iridium sulfate is employed in the preparation, small residual amounts of sulfur can be tolerated. Generally, however, the preferred iridium and arsenic compounds are either the oxides of these elements, the acids, or compounds convertible to the oxide on calcination.

Whichever catalyst preparation technique is used, the catalyst is activated prior to contact with the feed hydrocarbons by a calcination step. Thus, the finished catalyst is calcined in an oxygen-containing gas such as air at a temperature in the range of from about 900 to 1500° F. for a time in the range of about 1 to about 24 hours, or until the catalyst is active for carrying out the oxidative dehydrogenation step.

The hydrocarbon feedstocks can be dehydrogenated according to the processes and with the catalysts of the present invention at temperatures in the range of about 800 to about 1200° F., preferably from about 950 to about 1100° F.; at any convenient pressure such as from about 7 to 250 p.s.i.a.; and at a hydrocarbon: oxygen ratio of from about 1:0.5 to about 1:4. The presence of steam is frequently beneficial and a steam: hydrocarbon ratio up to about 50:1 can be used. The hydrocarbon feed rate will generally be in the range of about 50 to about 5,000 GHSV. The fixed catalyst bed is the preferred mode of contact, but other modes, such as the fluidized bed, can also be used.

The dehydrogenation processes of this invention are ordinarily carried out by forming a mixture, preferably preheated with a hydrocarbon feed, the oxygen-containing gas, and the steam (when used) and passing this mixture over the catalyst at the selected temperature. The effluent from the reaction zone is subjected to any suitable separation method to isolate and recover the desired products. Unconverted feeds or partially converted materials can be recycled.

The invention can be illustrated by the following examples.

EXAMPLE I

A series of catalysts was prepared as follows:

Catalyst A: This catalyst was prepared by impregnating a portion of zinc aluminate spinel with sufficient aqueous iridium tetrachloride solution to impregnate on said support 1.0 weight percent iridium, calculated as the metal. The iridium-impregnated support was dried for 4 hours at 220° F. in a forced draft oven and then calcined for 3 hours at 1100° F.

Catalyst B: This catalyst was prepared by impregnating a portion of zinc aluminate spinel with sufficient aqueous solution of a mixture of iridium tetrachloride and arsenic acid to impregnate on said support 1.0 weight percent iridium, calculated as the metal, and 0.38 weight percent arsenic, calculated as the metal. The iridium/arsenic-impregnated support was dried for 4 hours at 220° F. in a forced draft oven and then calcined for 3 hours at 1100° F.

Catalyst C: This catalyst was prepared by impregnating a portion of zinc aluminate spinel with sufficient aqueous solution of a mixture of iridium tetrachloride and stannous chloride to impregnate on said support 1.0 weight percent iridium, calculated as the metal, and 0.60 weight percent tin, calculated as the metal. The iridium/tin-impregnated support was dried for 4 hours at 220° F. in a forced draft oven and then calcined for 3 hours at 1100° F.

Catalyst D: This catalyst was prepared by impregnating a portion of zinc aluminate spinel with sufficient aqueous solution of a mixture of iridium tetrachloride and indium nitrate to impregnate on said support 1.0 weight percent iridium, calculated as the metal, and 0.58 weight percent indium, calculated as the metal. The iridium/indium-modified support was dried for 4 hours at 220° F. in a forced draft oven and then calcined for 3 hours at 1100° F.

Catalyst E: This catalyst was prepared by impregnating a portion of zinc aluminate spinel with sufficient aqueous solution of a mixture of iridium tetrachloride and gallium nitrate to impregnate on said support 1.0 weight percent iridium, calculated as the metal, and 0.35 weight percent gallium, calculated as the metal. The iridium/gallium-impregnated support was dried for 4 hours at 220° F. in a forced draft oven and then calcined for 3 hours at 1100° F.

Catalyst F: This catalyst was prepared by impregnating a portion of zinc aluminate spinel with sufficient aqueous solutions of a mixture of iridium tetrachloride and cupric nitrate to impregnate on said support 1.0 weight percent iridium, calculated as the metal, and 0.30 weight percent copper, calculated as the metal. The iridium/copper-impregnated support was dried for 4 hours at 220° F. in a forced draft oven and then calcined for 3 hours at 1100° F.

EXAMPLE II

A series of runs was effected employing the catalysts from the preceding example for the oxidative dehydrogenation of n-butane. In each run, butane at 50 GHSV, together with oxygen at a rate of 55 GHSV and steam at a rate of 500 GHSV was passed over the catalytic material at 1050° F. The results of these runs are reported in the following table:

| Catalyst number | Catalyst composition, weight percent | | Conversion | Modivity | Yield | Cracked | Oxidized |
|---|---|---|---|---|---|---|---|
| | Iridium | Modifier | | | | | |
| A | 1.0 | 0 | 100 | 0 | 0 | 0 | a 100 |
| B | 1.0 | 0.38 As | 67 | b 57 | b 38.0 | 7.2 | c 21.4 |
| C | 1.0 | 0.60 Sn | 100 | 0 | 0 | 0 | a 100 |
| D | 1.0 | 0.58 In | 100 | 0 | 0 | 0 | a 100 |
| E | 1.0 | 0.35 Ga | 100 | 0 | 0 | 0 | a 100 |
| F | 1.0 | 0.30 Cu | 100 | 0 | 0 | 0 | a 100 | a Conversion product included mixture of carbon oxides, e.g., CO and $CO_2$, etc.
b Yield and modivity to desired reaction product, i.e., 1,3-butadiene and mixed butenes.
c Carbon oxides only.

NOTE.—Modivity is modified selectivity based on analysis of gas phase product for converted hydrocarbons, oxides of carbon and unconverted feed. Conversion/yield are reported on same basis as modivity.

The foregoing data demonstrates that arsenic is a selective modifier for supported and unsupported iridium for use as an oxidative dehydrogenation catalyst and that such catalyst compositions in combination with a Group II aluminate spinel carrier material are effective in the dehydrogenation of paraffin feedstocks to diolefins and/or olefins. The data further show that iridium supported on a Group II aluminate spinel, by itself and with modifiers other than arsenic, is ineffective in converting the hydrocarbon feedstock to olefins and/or diolefins under the same conditions.

While certain embodiments of the invention have been described for illustrative purposes, the invention is not limited thereto. Various other modifications and embodiments of the invention will be apparent to those skilled in the art in view of this disclosure. Such modifications or embodiments are within the spirit and scope of the disclosure.

I claim:

1. A process for the dehydrogenation of a hydrocarbon feedstock having 2 to 12 carbon atoms and at least one

grouping which comprises contacting said feedstock in the vapor phase under dehydrogenation conditions in the presence of molecular oxygen with a catalyst consisting essentially of iridium in association with arsenic in combination with a Group II aluminate spinel carrier material.

2. A process according to claim 1 wherein said catalyst comprises 100 parts by weight of said Group II aluminate spinel, from about 0.01 to about 10 parts by weight of said iridium or a compound of iridium, calculated as the metal, and from about 0.01 to about 5 parts by weight of arsenic or a compound of arsenic, calculated as the metal.

3. A process according to claim 2 wherein the amount of said iridium is in the range of about 0.25 to about 2.5 parts by weight and the amount of arsenic is in the range of about 0.25 to about 1.0 parts by weight.

4. A process according to claim 3 wherein said hydrocarbon feedstock comprises a paraffinic feedstock.

5. A process according to claim 4 wherein said hydrocarbon feedstock comprises butane.

6. A process according to claim 5 wherein said Group II aluminate spinel is zinc aluminate spinel.

References Cited
UNITED STATES PATENTS

| | | | |
|---|---|---|---|
| 3,524,898 | 8/1970 | Beirne | 260—683.3 |
| 3,360,586 | 12/1967 | Bloch et al. | 260—683.3 |
| 3,429,944 | 2/1969 | Kuchar | 260—683.3 |
| 3,461,183 | 8/1969 | Hepp et al. | 260—680 |
| 3,470,262 | 9/1969 | Michaels et al. | 260—680 |

PAUL M. COUGHLAN, JR., Primary Examiner

U.S. Cl. X.R.

252—466 R; 260—683.3